US012599905B2

(12) United States Patent
Zhou et al.

(10) Patent No.: US 12,599,905 B2
(45) Date of Patent: Apr. 14, 2026

(54) DROPLET GENERATOR

(71) Applicant: Zhejiang Dapu Biotechnology Co., Ltd., Zhejiang (CN)

(72) Inventors: Hongbo Zhou, Zhejiang (CN); Ruyuan Song, Zhejiang (CN); Xiaonan Xu, Zhejiang (CN)

(73) Assignee: Zhejiang Dapu Biotechnology Co., Ltd., Jiaxing (CN)

( * ) Notice: Subject to any disclaimer, the term of this patent is extended or adjusted under 35 U.S.C. 154(b) by 1043 days.

(21) Appl. No.: 17/715,426

(22) Filed: Apr. 7, 2022

(65) Prior Publication Data

US 2023/0201834 A1 Jun. 29, 2023

(30) Foreign Application Priority Data

Dec. 24, 2021 (CN) ......................... 202111599026.9
Dec. 24, 2021 (CN) ......................... 202123281034.7
Dec. 24, 2021 (CN) ......................... 202123283480.1
Dec. 24, 2021 (CN) ......................... 202123283518.5

(51) Int. Cl.
*B01L 3/00* (2006.01)

(52) U.S. Cl.
CPC . *B01L 3/502784* (2013.01); *B01L 2200/0673* (2013.01); *B01L 2300/0883* (2013.01); *B01L 2300/123* (2013.01); *B01L 2400/0487* (2013.01)

(58) Field of Classification Search
CPC ................ B01L 3/00; B01L 3/502784; B01L 2200/0883; B01L 2300/123; B01L 2400/0487; B01F 33/3011
USPC ................................ 422/500, 502–503, 527
See application file for complete search history.

(56) References Cited

U.S. PATENT DOCUMENTS 10,745,742 B2 8/2020 Bent et al.
2017/0128940 A1* 5/2017 Amini ................ B01F 33/3011

* cited by examiner

*Primary Examiner* — Monzer R Chorbaji
(74) *Attorney, Agent, or Firm* — NZ Carr Law Office

(57) ABSTRACT

The present invention provides a droplet generator. The droplet generator includes a large-corner continuous U-shaped flow channel on the encoded microsphere flow channel. Controlling the turning radius of the continuous U-shaped flow channel prevents the blockage resulted from accumulation of microfibers in the encoded microsphere suspension at the turn of the continuous U-shaped flow channel. A buffer tank is arranged at the encoded microsphere flow channel, which is used for the pre-arrangement of the encoded microspheres, to increase the controllability of the flow rate of the encoded microspheres. The buffer tank is provided in the oil-phase flow channel to prevent the oil phase from infiltrating into the aqueous phase due to excessive flow rate, and increase the controllability of the oil phase flow rate. The droplet generator has simple structure, low cost, high-throughput, and high-stability, and may be used to prepare single-cell single-encoded microsphere droplets.

17 Claims, 4 Drawing Sheets

DROPLET GENERATOR

This application claims the priority of the earlier application in China, with Application No. 2021232835185, filed Dec. 24, 2021, Application No. 2021232810347, filed Dec. 24, 2021, Application No. 2021232834801, filed Dec. 24, 2021, and Application No. 2021115990269, filed Dec. 24, 2021, each of which applications including Specification, Accompanying Drawings and Claims, is entirely incorporated herein by reference.

FIELD OF THE INVENTION

The present invention relates to the technical field of micro fluidics, specifically to a droplet generator for generating multi-bead droplets, and particularly to a multi-bead droplet generator in which an encoded microsphere flow channel is provided with a large-corner continuous U-shaped flow channel, and both the encoded microsphere flow channel and an oil-phase flow channel are provided with a buffer tank.

BACKGROUND OF THE INVENTION

Microfluidic chip can integrate basic operation units for sample preparation, reaction, separation, detection, cell culture, sorting, lysis, etc. involved in the chemical and biological fields; by designing flow channels with different shapes, different functions can be realized on the microfluidic chip, so it is also called Lab-on-a-Chip. Compared with the traditional laboratory, the microfluidic chip has the advantages of less consumption of reagents, short time of reaction or analysis, etc., which reduces the consumption of expensive reagents, so the cost can be controlled. Shortening the time is conducive to reduce the experimental cycle, and with the chip size of square centimeter or even square millimeter level, the experimental cost is greatly reduced in time and space. There are many application fields of microfluidics, which have important applications in the fields of chemistry, biology, and medicine, etc.

The microparticles are prepared by the microfluidic technology. The microfluidic technology can not only precisely control the size, shape, monodispersity, shell thickness, and internal structure, shape and components of microparticles, but also can endow the microparticles with more diverse functions through the ingenious combination of the particle structure and the functional components, thus providing new ideas and guidance for the design and development of novel microparticle-type functional materials.

In biology, droplets can wrap around cells and act as bioreactors. Cells can be encapsulated and cultured into tissues or organoids. Droplets can also be used for cell sorting, such as sorting sperm and fertilized eggs, for artificial reproduction, including artificial insemination, in vitro fertilization, cloning and embryo division or cleavage. In the field of biochemistry, dispersed droplets can be handled and manipulated independently. Each droplet acts as an independent microreactor.

Multi-bead droplets mean that two or more beads are contained in each droplet generated, including cells, encoded microspheres (microspheres), etc. In order to meet the needs of biochemical experiments, there have been devices and schemes for realizing droplets with various beads as microreactors in the prior art, for example, the dual-bead droplet microfluidic chip involved in Dropseq and 10× (U.S. Ser. No. 10/745,742B2). However, these existing devices and solutions generally have problems such as easy blockage of the encoded microsphere flow channel, difficulty in controlling the flow rate of the encoded microspheres in the encoded microsphere flow channel, and easy permeation of oil phase into the aqueous phase, resulting in unfavorable results such as low effective flux or low ratio of effective droplets, etc.

Therefore, it is urgent to find a multi-bead droplet generator with a simple structure, which can effectively control the flow rate and flow resistance of the encoded microspheres and the oil phase, is not easy to block the encoded microsphere flow channel, and can prevent the oil phase from permeating into the aqueous phase, and has a high ratio of effective droplets.

SUMMARY OF THE INVENTION

In order to solve the foregoing problems, the present invention provides a droplet generator. According to the droplet generator, by arranging a large-corner continuous U-shaped flow channel on the encoded microsphere flow channel, controlling the turning radius of the continuous U-shaped flow channel, the big bending and big turning is ensured and the blockage as a result of accumulation of microfibers in the microsphere suspension at the turn of the continuous U-shaped flow channel is prevented, and the length of the continuous U-shaped flow channel, and the angle of inclination of the straight flow channel connecting the two turns are controlled; meanwhile, a buffer tank is arranged at the encoded microsphere flow channel, which is used for the pre-arrangement of the encoded microsphere to increase the controllability of the flow rate of the encoded microspheres; a buffer tank is arranged at the oil-phase flow channel, so that the oil phase must first fill the buffer tank before entering the droplet generation flow channel, thereby preventing the oil phase from infiltrating into the aqueous phase due to excessive flow rate, and increasing the controllability of the oil phase flow rate; finally efficient, high-throughput and high-stability preparation of single-cell single-encoded microsphere droplets is realized, the waste of expensive cell samples is reduced, furthermore, the structure is simple, the cost is low, so it is suitable for industrial applications.

The multi-bead droplets referred to in the present invention mean that a variety of beads are contained in each droplet prepared. In biochemical experiments, it is often necessary to use such multi-bead droplets as bioreactors. For example, in single-cell sequencing, a dual-bead droplet is used, and such dual-bead droplet contains one single-cell and one encoded microsphere with primers (microspheres, for example, PMMA microspheres, etc.), so that the reaction can be performed in the droplet reaction chamber to complete the sequencing.

Effective droplets mean that the prepared multi-bead droplets contain exactly one bead for each type. For example, for a dual-bead droplet used in single-cell sequencing, effective droplets mean that each dual-bead droplet must contain exactly one single cell and one encoded microsphere.

The single-cell single-encoded microsphere droplet generator requires two aqueous phases and one oil phase. The two aqueous phases are encoded microsphere suspension and cell suspension, respectively. The encoded microsphere suspension is mixed with the cell suspension first, and enters the droplet generation place with the oil phase, and under the action of shear force, the encoded microsphere and cell mixture are cut into droplets of uniform size by the oil phase.

The existing single-cell single-encoded microsphere droplet generator has the following three problems: firstly, continuous U-shaped flow channel is generally used in the encoded microsphere flow channel, which is prone to blockage; secondly, only the continuous U-shaped flow channel is used to control the flow rate of the encoded microspheres in the encoded microsphere suspension, and the control effect is poor; thirdly, for the oil phase, the flow rate of the oil phase is controlled by only adjusting the pressure at the oil phase inlet, and the control effect is poor.

For the first problem, when a common continuous U-shaped flow channel is used, the continuous U-shaped flow channel of the encoded microsphere flow channel is easy to be blocked. The reason is that, when preparing a single-cell single-encoded microsphere droplet, it is necessary to introduce cell suspension, encoded microsphere suspension and oil phase into a microfluidic system to generate droplets. The cell suspension and oil phase can be filtered through a filter membrane to ensure that they do not contain impurities such as dust and microfibers, such that the cell suspension and oil phase will not be blocked when passing through the continuous U-shaped flow channel, and the flow resistance can be effectively controlled, thereby the flow rate can be controlled. The encoded microspheres in the encoded microsphere suspension have a large diameter, generally about 50 μm, so they cannot be filtered by a filter membrane, resulting in some remnant impurities such as dust and microfibers in the encoded microsphere suspension.

The continuous U-shaped flow channel can be used to control the flow rate of the liquid in the flow channel and to arrange the beads. The arrangement of beads in the bead suspension into a single streamline is used to improve the effective single droplet rate, also known as the focusing of samples. It is an important link in the devices such as chips for cell counting, detection and separation, etc. and directly affects the accuracy and efficiency of subsequent detection and sorting, which is of great significance in the field of medical testing. However, the existing continuous U-shaped flow channels are all made up of regular U-shaped flow channels that are connected one by one, and their turning range at the turn is small, so it is not suitable for encoded microsphere suspension. During continuous use, the impurities such as dust and microfibers in the encoded microsphere suspension tend to accumulate gradually at the turns of the continuous U-shaped flow channel, causing blockage and seriously affecting the efficiency and quality of droplet preparation. In the present invention, by arranging a continuous U-shaped flow channel with large corners for the encoded microsphere suspension, the radius at the turn is controlled in an appropriate range, so that the encoded microsphere suspension can pass through the turn with a larger turning radius, and by controlling the flow rate, the impurities such as dust and microfibers cannot be accumulated at the turning, thus solving the problem of blocking of encoded microsphere suspension at the turning after a long-term operation.

For the second problem, a large number of studies have proved that, although the flow rate of the encoded microsphere suspension can be basically controlled by continuous U-shaped flow channel, it is unable to control the same spacing between one encoded microsphere and another encoded microsphere in the encoded microsphere suspension. However, only by maintaining the same spacing between one encoded microsphere and another encoded microsphere, each encoded microsphere and each cell can be wrapped under the action of shearing force of the oil phase, thereby single-cell single-encoded microsphere droplets are prepared. This is the decisive condition to truly improve the ratio of effective droplets.

Since cell samples are very precious and scarce and the cell volume is small, the cell suspension is almost equivalent to the aqueous phase, and the ratio of effective droplets can only be improved by controlling the flow rate of the cell suspension, which is difficult to achieve the precise control of flow status of each cell. Encoded microspheres are low in price and large in quantity and volume, and are easy to control. In order to make the cell suspension to just meet an encoded microsphere every time and to be wrapped smoothly, we need to control the flow rate of the cell suspension as much as possible, and more importantly, control the spacing among encoded microspheres as much as possible, so that each cell can be combined with the corresponding encoded microsphere and wrapped into droplets when passing by, to make full use of the cell samples, without causing the waste of expensive cell samples, and improve the ratio of effective droplets.

The encoded microspheres (hydrogel microspheres) in the encoded microsphere suspension have a larger diameter, and the proportion of each encoded microsphere is very large in the encoded microsphere suspension. The flow status of each encoded microsphere in the flow channel will affect the flow resistance of the encoded microsphere suspension. Therefore, the encoded microsphere suspension cannot be regarded as a simple aqueous phase, and the flow rate cannot be controlled only by the continuous U-shaped flow channel. Since the flow resistance of the encoded microsphere suspension is closely related to the flow status of the encoded microspheres in the flow channel, the flow resistance can be changed by changing the structure of the flow channel, thereby strengthening the control over the flow status of the encoded microspheres. In the present invention, a buffer tank is added on the encoded microsphere flow channel. When the encoded microsphere suspension enters the buffer tank, since the width of the tank gradually increases, the flow resistance gradually decreases, and the flow resistance at the bottom of the tank is the smallest. If the encoded microspheres flow out of the bottom of the tank, they need to overcome the flow resistance that increases suddenly at the bottom of the tank, to enter the encoded microsphere flow channel. Therefore, it is not easy for the encoded microspheres to flow out of the bottom of the tank at the beginning, so that the encoded microspheres in the encoded microsphere suspension are pre-arranged in the buffer tank, having an effect of re-aggregating the encoded microspheres. After the tank is filled, the pressure applied to the encoded microspheres is enough to overcome the suddenly increased flow resistance at the lower end of the tank, the encoded microspheres will flow out of the lower end of the tank with the fluid at an equal distance. At this time, the change in flow resistance of each encoded microsphere is the same. Therefore, the flow rate of each encoded microsphere flowing out of the tank is the same, which is equivalent to making each encoded microsphere flow out at the same spacing, increasing the controllability of the flow rate of each encoded microsphere in the encoded microsphere suspension, thereby improving the preparation efficiency and quality of effective droplets.

For the third problem, a large number of studies have proved that oil phase fluid is very easy to reversely infiltrate into the aqueous phase due to its own characteristics. Therefore, if the oil phase flow rate is adjusted only by adjusting the inlet pressure of the oil phase, the oil phase is easy to reversely infiltrate into the aqueous phase when the pressure of the aqueous phase drops slightly. In the present invention, a buffer tank and a continuous U-shaped flow channel are also provided for the oil phase. The flow resistance is increased through the continuous U-shaped flow channel, and the flow rate of the oil phase is controlled by the buffer tank. When the oil phase enters the buffer tank, since the flow resistance drops and the width of the tank is increased gradually, the flow resistance gradually decreases, the oil phase will fill the tank first. The oil phase flowing out of the tank needs to overcome the suddenly increased flow resistance, therefore, when the oil phase will flow out of the tank when the tank is filled and the pressure is enough to overcome the suddenly increased flow resistance, which is equivalent to adding an additional control for the oil phase, increasing the flow resistance and significantly increasing the controllability of the oil phase flow rate, enhancing the resistance of reverse infiltration of oil phase into the aqueous phase, and significantly reducing the possibility of reverse infiltration of oil phase into the aqueous phase.

In addition, since the cell volume in the cell suspension is very small and the proportion of each cell in the cell suspension is also very small, the effect of each cell on the flow resistance of the cell suspension is almost negligible, which is similar to the aqueous phase; therefore, there is no need to provide a buffer tank for pre-arrangement of the cell suspension.

In one aspect, the present invention provides a droplet generator, comprising a wrapped biological material flow channel, an encoded microsphere flow channel and an oil-phase flow channel; wherein the encoded microsphere flow channel comprises an arc-shaped flow channel, the arc-shaped flow channel comprises one or more segments of circular arc-shaped flow channels with different radii, at least one of the circular arc-shaped flow channels has a radius that is more than 6 times the width of the encoded microsphere flow channel; wherein, the encoded microsphere flow channel is also provided with an encoded microsphere flow channel tank, the flow resistance of the encoded microsphere fluid in the encoded microsphere buffer tank is less than the flow resistance of the encoded microsphere flow channel; the biological material can be selected from one or more of cells, nucleic acids, proteins, antibodies or antibody fragments.

In some embodiments, the biomaterial is selected from cells, and the droplet generator comprises a cell flow channel, an encoded microsphere flow channel, and an oil-phase flow channel.

In some embodiments, the encoded microsphere flow channel including the arc-shaped flow channel provided by the present invention is equivalent to the arrangement of a continuous U-shaped flow channel with a large corner on the encoded microsphere flow channel; at each turning of the continuous U-shaped flow channel with a large corner of the arc-shaped flow channel, the turning radius of the large-corner continuous U-shaped flow channel is more than 6 times the width of the flow channel.

The large corner in the present invention means that the turning range of the flow channel is relatively large at the turning connecting the two flow channels. The flow channel at the turning can be a regular circular arc-shaped flow channel, or an arc-shaped flow channel composed of multiple circular arc-shaped flow channels with different radii, but at least one of the arcs must have a radius of more than 6 times the width of the flow channel.

The shape and structure of the continuous U-shaped flow channel (arc-shaped flow channel) of the encoded microsphere suspension of the present invention is different from the shape and structure of the traditional continuous U-shaped flow channel, and a corner with a large range is used at the turning corner in the present invention. The upper and lower flow channels connecting the turning may be or may not be parallel to each other.

In some embodiments, the upper and lower flow channels connecting the arc-shaped flow channel are parallel to each other, but the spacing between the upper and lower flow channels becomes larger due to the existence of large corner.

In some other manners, the upper and lower flow channels connecting the arc-shaped flow channel are not parallel to each other, and the extension lines of the two flow channels extending toward the turning direction intersect to form an acute angle.

In the present invention, by arranging a continuous U-shaped flow channel with large corners for the encoded microsphere suspension, the radius at the turning is controlled in an appropriate range, so that the encoded microsphere suspension can pass through the turning with a larger turning radius, and by controlling the flow rate, the impurities such as dust and microfibers cannot be accumulated at the turning, thus solving the problem of blocking of encoded microsphere suspension at the turning after a long-term operation. That is, when the encoded microspheres pass through a turning with a larger turning radius at a certain flow rate (0.01-0.1 μL/s), all impurities such as dust and microfibers will be washed away at the flow rate, and cannot be accumulated at the turning; however, if the turning radius is small at the same flow rate, the impurities such as dust and microfibers in the encoded microsphere suspension are possibly not taken away and gradually deposited; with the increasing deposition of impurities (dust and microfibers, etc.), the flow resistance is increasing, and the flow rate is getting smaller and smaller, which further aggravates the deposition phenomenon and causes blocking after a long-term operation.

A large number of studies have demonstrated that, when the flow rate of the encoded microsphere suspension is (0.01-0.1 μL/s), by just controlling the radius of the turning (arc-shaped flow channel) of the continuous U-shaped flow channel is more than 6 times the width of the encoded microsphere flow channel, the impurities such as dust and microfibers in the encoded microsphere suspension cannot be accumulated at the turning, thereby ensuring the smooth operation of the encoded microsphere flow channel for a long time.

The widths of all encoded microsphere flow channels are the same. The continuous U-shaped flow channel is a part of the encoded microsphere flow channel. The width of the continuous U-shaped flow channel is also the same as that of other parts of the encoded microsphere flow channel.

Since the flow resistance of the encoded microsphere buffer tank is smaller than that of the encoded microsphere flow channel and it needs to overcome the suddenly increased flow resistance at the lower end of the tank to flow out, the encoded microspheres are pre-arranged in the buffer tank first, and through controlling the flow resistance at the inlet of the encoded microsphere suspension, the flow rate of the encoded microsphere suspension is (0.01-0.1 μL/s). After the tank is filled, the encoded microspheres will overcome the suddenly increased flow resistance, and flow out of the lower end of the tank with the fluid at an equal distance.

Further, the radius of the circular arc-shaped flow channel is 6 to 20 times the width of the flow channel.

As will be appreciated, the turning radius of the continuous U-shaped flow channel (arc-shaped flow channel) cannot be increased indefinitely. It is also necessary to consider the layout of the entire microfluidic system and achieve proper control of the flow resistance, so as to control the flow rate of the encoded microspheres and ensure the generation of effective droplets.

Further, the radius of the circular arc-shaped flow channel is 10 times the width of the flow channel.

A large number of experiments have demonstrated that, when the turning radius of the continuous U-shaped flow channel (arc-shaped flow channel) is 10 times the width of the flow channel, the impurities such as dust and microfibers in the encoded microsphere suspension cannot be accumulated at the turning, and the flow resistance can be well controlled, thereby helping to stabilize the flow rate of the encoded microspheres and further improving the generation efficiency of effective droplets.

Further, the extension lines of two straight flow channels that are connected with the turning intersect at an acute angle.

As will be appreciated, when the upper and lower flow channels at the turning are not parallel to each other, that is, when the extension lines of the two flow channels extending toward the turning intersect at an acute angle, impurities such as dust and microfibers in the encoded microsphere suspension will be more unlikely to be blocked at the turning.

Further, there are one or more arc-shaped flow channels.

As will be appreciated, the more arc-shaped flow channels, the more effectively the flow resistance can be controlled.

Further, there are two arc-shaped flow channels.

In order to ensure the big bending and big turning of the continuous U-shaped flow channel, it is unable to establish too many turnings (arc-shaped flow channel) for the continuous U-shaped flow channel; in addition, due to the turning with a great angle and other straight flow channels, the flow resistance can be controlled smoothly, and there is no need to establish too many turnings (arc-shaped flow channel). Generally, there are two turnings, one on the left and one on the right.

Further, the straight flow channel connecting the two arc-shaped flow channels is arranged horizontally or arranged to be inclined upwardly or inclined downwardly.

The straight flow channel connecting the two turnings can be horizontal, or can be inclined upwardly or downwardly, thereby increasing the flow resistance and better controlling the flow rate. The "horizontal" herein means that, when the droplet generator including the continuous U-shaped flow channel is placed vertically, the straight flow channel connecting the two turnings is parallel to the horizontal plane of the ground, that is, perpendicular to the vertical downward direction of the center of gravity. The "upwardly" means the upstream direction of the fluid; the "downwardly" means the downstream direction of the fluid.

Further, the straight flow channel connecting the two arc-shaped flow channels is arranged to be inclined upwardly, the arc-shaped flow channel and the straight flow channel that is connected with the arc-shaped flow channel form a large-corner continuous U-shaped flow channel of the encoded microsphere flow channel.

Further, the large-corner continuous U-shaped flow channel comprises an inlet segment straight flow channel and an outlet segment straight flow channel, and the angle between the inlet segment straight flow channel and the inlet segment of the encoded microsphere flow channel is greater than or equal to 90 degrees.

While ensuring the big bending and big turning of the continuous U-shaped flow channel, the junction between the continuous U-shaped flow channel and other straight flow channel should also ensure big bending and big turning, so that the encoded microsphere suspension can smoothly transition from other straight flow channels to the continuous U-shaped flow channel, and from the continuous U-shaped flow channel to other straight flow channels, and the blocking of impurities such as dust and microfibers can be prevented in the encoded microsphere suspension.

Further, the angle between the outlet segment straight flow channel of the large-corner continuous U-shaped flow channel and the outlet segment of the encoded microsphere flow channel is greater than or equal to 90 degrees.

As will be appreciated, when the upper and lower flow channels connecting the turning are parallel to each other, the angle between the inlet segment straight flow channel and the inlet segment of encoded microsphere flow channel, or the angle between the outlet segment straight flow channel and the outlet segment of encoded microsphere flow channel can be set to 90 degrees or greater than 90 degrees to ensure big bending and big turning; when the upper and lower flow channels at the turning are not parallel to each other, that is, when the extension lines of the two flow channels extending toward the turning direction intersect at an acute angle, the angle between the inlet segment straight flow channel and the inlet segment of encoded microsphere flow channel, or the angle between the outlet segment straight flow channel and the outlet segment of encoded microsphere flow channel is preferably greater than 90 degrees.

Further, the width of the encoded microsphere flow channel is 50-100 μm, and the turning radius of the large-corner continuous U-shaped flow channel is 500-1000 μm.

Further, the width of the encoded microsphere flow channel is 50 μm, and the turning radius of the large-corner continuous U-shaped flow channel is 500 μm.

Further, the total length of the large-corner continuous U-shaped flow channel is 15,000-25,000 μm; the straight flow channel connecting the two turnings is inclined upwardly and the angle with the horizontal line is 10-15 degrees, and the length is 4,000-6,000 μm; the length of the inlet segment straight flow channel is 4,000-6,000 μm, and the angle with the inlet segment of encoded microsphere flow channel is 90-180 degrees; the length of the outlet segment straight flow channel is 4,000-6,000 μm, and the angle with the outlet segment of encoded microsphere flow channel is 90-180 degrees.

Further, the total length of the large-corner continuous U-shaped flow channel is 20,000 μm; the straight flow channel connecting the two turnings is inclined upwardly, the angle with the horizontal line is 10-15 degrees, and the length is 6240 μm; the length of the inlet segment straight flow channel is 5,000 μm, and the angle with the inlet segment of encoded microsphere flow channel is 120 degrees; the length of the outlet segment straight flow channel is 5,000 μm, and the angle with the outlet segment of encoded microsphere flow channel is 120 degrees.

By controlling the total length of the continuous U-shaped flow channel and the length of each straight flow channel in the continuous U-shaped flow channel, the flow resistance can be further controlled accurately, and the flow rate can be adjusted more accurately, thereby improving the generation rate of effective droplets.

Further, the volume of the encoded microsphere buffer tank is larger than the volume of the encoded microsphere flow channel of the same length.

Further, the width of the encoded microsphere buffer tank is greater than the width of the encoded microsphere flow channel, and/or the depth of the encoded microsphere buffer tank is greater than the depth of the encoded microsphere flow channel.

Further, the width of the encoded microsphere buffer tank is 5 to 15 times the width of the encoded microsphere flow channel, and the depth of the encoded microsphere buffer tank is 2 to 5 times the depth of the encoded microsphere flow channel.

Further, the shape of the encoded microsphere buffer tank gradually enlarges from top to bottom, and then rapidly retracts downwardly.

The shape of the encoded microsphere buffer tank has a very important influence on controlling the flow rate of the encoded microspheres. The shape of the encoded microsphere buffer tank gradually enlarges from top to bottom, and then rapidly retracts downwardly, so that the flow resistance of the encoded microsphere suspension entering the encoded microsphere buffer tank gradually decreases, and then increases rapidly after passing the encoded microsphere buffer tank, the encoded microspheres are pre-arranged in the buffer tank first, to achieve the effect of re-aggregating the encoded microspheres; when the tank is filled, encoded microspheres will flow out of the lower end of the tank with the fluid at equal distances by overcoming the suddenly increased flow resistance.

The overall shape of the encoded microsphere buffer tank is similar to that of a water droplet, with smooth borders, which can avoid dead volume, so that all the stored encoded microspheres will flow out in sequence and will not reside in.

The size of the encoded microsphere buffer tank will directly affect the effect of pre-arranging the encoded microspheres and controlling the spacing of the encoded microspheres by the encoded microsphere buffer tank. The width of the encoded microsphere buffer tank is controlled to be 5 to 15 times the width of the encoded microsphere flow channel, and the depth is controlled to be 2 to 5 times the depth of the encoded microsphere flow channel, which can better ensure the effect of the encoded microsphere buffer tank and ensure generation of effective droplets in an efficient and quality manner.

Further, the encoded microsphere flow channel comprises a continuous U-shaped flow channel, and the encoded microsphere buffer tank is located below the continuous U-shaped flow channel.

Further, the width of the encoded microsphere flow channel is 40-100 μm and the depth of the encoded microsphere flow channel is 40-100 μm; the width of the widest part of the encoded microsphere buffer tank is 200-1500 μm, the depth of the deepest part is 200-1,500 μm, and the length is 200-2,000 μm.

Further, the width of the encoded microsphere flow channel is 50 μm and the depth of the encoded microsphere flow channel is 50 μm; the width at the widest part of the encoded microsphere buffer tank is 500 μm, the depth at the deepest part is 150 μm, and the length is 1280 μm.

Further, the oil-phase flow channel is provided with an oil phase buffer tank, and the flow resistance of the oil phase in the oil phase buffer tank is smaller than that in the oil-phase flow channel.

Further, the oil-phase flow channel is divided into a first oil-phase flow channel and a second oil-phase flow channel, and each of the first oil-phase flow channel and the second oil-phase flow channel is provided with an oil phase buffer tank.

Further, the first oil-phase flow channel and the second oil-phase flow channel comprise a continuous U-shaped flow channel, and the oil phase buffer tank is located on the continuous U-shaped flow channel.

The arrangement of a continuous U-shaped flow channel on the oil-phase flow channel can help control the flow rate and enhance the control effect on the oil-phase flow rate.

Further, the volume of the oil phase buffer tank is larger than the volume of the oil-phase flow channel of the same length.

Further, the width of the oil phase buffer tank is greater than the width of the oil-phase flow channel, and/or the depth of the oil phase buffer tank is greater than the depth of the oil-phase flow channel.

Further, the width of the oil phase buffer tank is 5 to 15 times the width of the oil-phase flow channel, and the depth is 2 to 5 times the depth of the oil-phase flow channel.

Further, the shape of the encoded microsphere buffer tank gradually enlarges from top to bottom, and then rapidly retracts downwardly.

The oil phase buffer tank is equivalent to a reservoir, so that the oil phase must be filled with the oil phase buffer tank before continuing to flow to the oil-phase flow channel. The size of the oil phase buffer tank will directly affect the effect of the oil phase buffer tank to increase the controllability of the oil phase flow rate and improve the resistance of oil phase to reversely infiltrate into the aqueous phase. The width of the oil phase buffer tank is controlled to be 5 to 15 times the width of the oil-phase flow channel, and the depth of the oil phase buffer tank is controlled to be 2 to 5 times the depth of the oil-phase flow channel, so as to better ensure the effect of the oil phase buffer tank and further ensure the generation of effective droplets in an efficient and quality manner.

Further, the oil-phase flow channel has a width of 40-100 μm and a depth of 40-100 μm; the oil phase buffer tank has a width of 200-1500 μm at the widest part, a depth of 200-1500 μm at the deepest part, and a length of 200-2,000 μm.

Further, the oil-phase flow channel has a width of 40 μm and a depth of 40 μm; the oil phase buffer tank has a width of 400 μm at the widest point, a depth of 150 μm at the deepest point and a length of 1,280 μm.

Further, the cell flow channel and the encoded microsphere flow channel constitute a first cross-shaped flow channel, and the output channel of the first cross-shaped flow channel and the oil-phase flow channel constitute a second cross-shaped flow channel.

Further, the spacing between the first cross-shaped flow channel and the second cross-shaped flow channel should be kept at 20-500 μm.

Studies have demonstrated that, the length of the output channel between the first cross-shaped flow channel and the second cross-shaped flow channel must be kept within a certain range, to better play the role of forming effective droplets by oil phase shear wrapping. Because a certain time interval is required between each shearing and wrapping of the oil phase to form droplets, and the spacing between the first cross-shaped flow channel and the second cross-shaped flow channel should match with the time interval for forming droplets between each shearing and wrapping of the oil phase, so as to further improve the efficiency of generating effective droplets.

Further, the width and/or depth of the outlet segment flow channel of the second cross-shaped flow channel is greater than the width and/or depth of the outlet end.

Studies have demonstrated that, when the width and/or depth of the outlet segment flow channel of the second cross-shaped flow channel is larger than the width and/or depth of the outlet end, the resulting droplets can flow out faster; the reason is that, with the increase in the width and/or depth, the flow resistance is reduced and the flow rate is accelerated.

In some embodiments, the width of the outlet segment flow channel of the second cross-shaped flow channel is 1.5 to 3 times the width of the outlet end.

With the increase in the width and/or depth, the flow resistance is reduced and the flow rate is accelerated, but the flow rate should not be too fast, otherwise, it will cause difficulty to the subsequent droplet sorting. When the width of the outlet segment flow channel of the second cross-shaped flow channel is 1.5 to 3 times the width of the outlet end, more effective droplets can be obtained more efficiently, and the flow resistance and flow rate are all within the controllable range.

The present invention provides a droplet generator with a buffer tank. The droplet generator has the following beneficial effects:

1. In the present invention, by arranging a continuous U-shaped flow channel with large corners for the encoded microsphere suspension, the radius at the turning is controlled in an appropriate range, so that the encoded microsphere suspension can pass through the turning with a larger turning radius, and by controlling the flow rate, the impurities such as dust and microfibers cannot be accumulated at the turning, thus solving the problem of blocking of encoded microsphere suspension at the turning after a long-term operation;
2. The encoded microsphere buffer tank is arranged on the encoded microsphere flow channel, so that encoded microspheres are pre-arranged in a buffer tank, and after the tank is full, encoded microspheres can overcome suddenly increased flow resistance from the lower end of the tank and flow out along with fluid at equal distances, to accurately control the spacing of the encoded microspheres, improve the controllability of the flow rate of each encoded microsphere in the encoded microsphere suspension, and enhance the preparation efficiency and quality of effective droplets;
3. Through a combined design of a large-corner continuous U-shaped flow channel and an encoded microsphere buffer tank arranged on the encoded microsphere flow channel, long-time accurate control over the spacing of the encoded microsphere is achieved, the flow resistance and the flow speed of the encoded microsphere suspension can be effectively controlled for a long time, the ratio of effective droplets is greatly increased, and the obvious synergistic effect is achieved;
4. An oil phase buffer tank is provided on an oil-phase flow channel, the oil phase buffer tank must be filled with an oil phase firstly, then the oil phase can continue to flow to the oil-phase flow channel, which is equivalent to adding an additional control for the oil phase, increasing the flow resistance and significantly increasing the controllability of the oil phase flow rate, enhancing the resistance of reverse infiltration of oil phase into the aqueous phase, significantly reducing the possibility of reverse infiltration of oil phase into the aqueous phase, and further improving the ratio of effective droplets;
5. A proper spacing is kept between a first cross-shaped flow channel and a second cross-shaped flow channel, the width of the outlet segment flow channel of the second cross-shaped flow channel is 1.5 to 3 times the width of the outlet end, and therefore effective droplets are generated more efficiently;
6. The flow resistance is increased, the flow speed is accurately controlled, and the ratio of the effective droplets is increased; and
7. The structure is simple, convenient and efficient, the cost is low, so it is easy to popularize.

DETAILED DESCRIPTION

The preferred embodiments of the present invention will be further described in detail below with reference to the accompanying drawings. It should be noted that the following embodiments are intended to facilitate the understanding of the present invention, but do not constitute any limitation on the present invention. The raw materials and equipment used in the specific embodiments of the present invention are all known products, and are commercially available.

Example 1 Droplet Generator of the Present Invention

Figure 1:
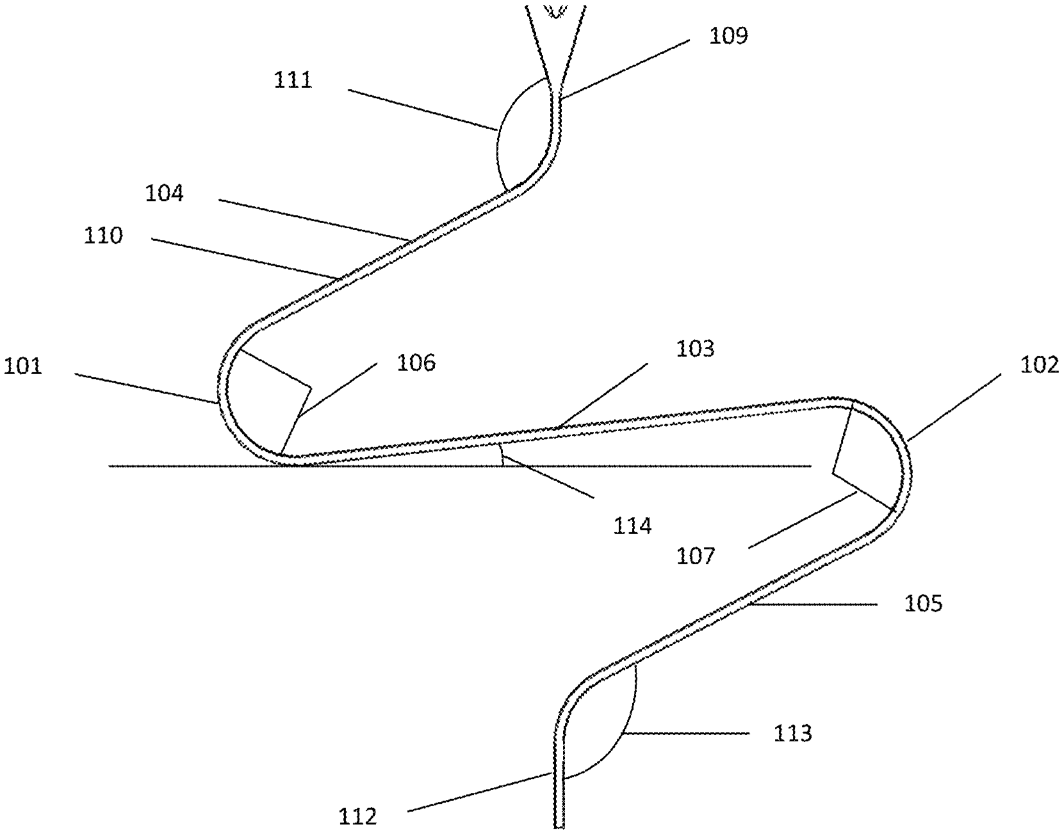
FIG. 1 is a schematic diagram of a structure of an encoded microsphere flow channel in a droplet generator of Example 1.
Figure 2:
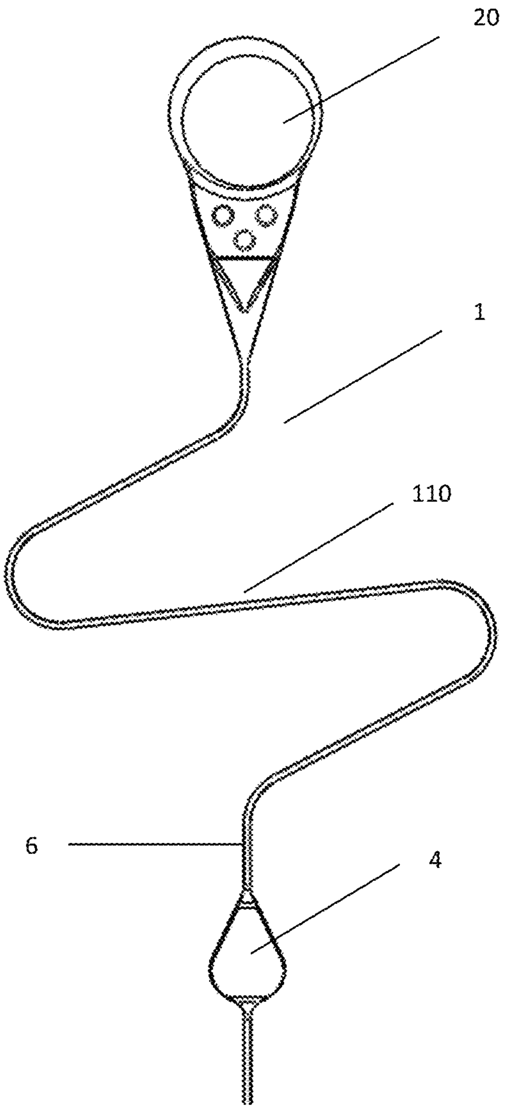
FIG. 2 is a schematic diagram of an overall structure of a droplet generator of Example 1.
Figure 3:
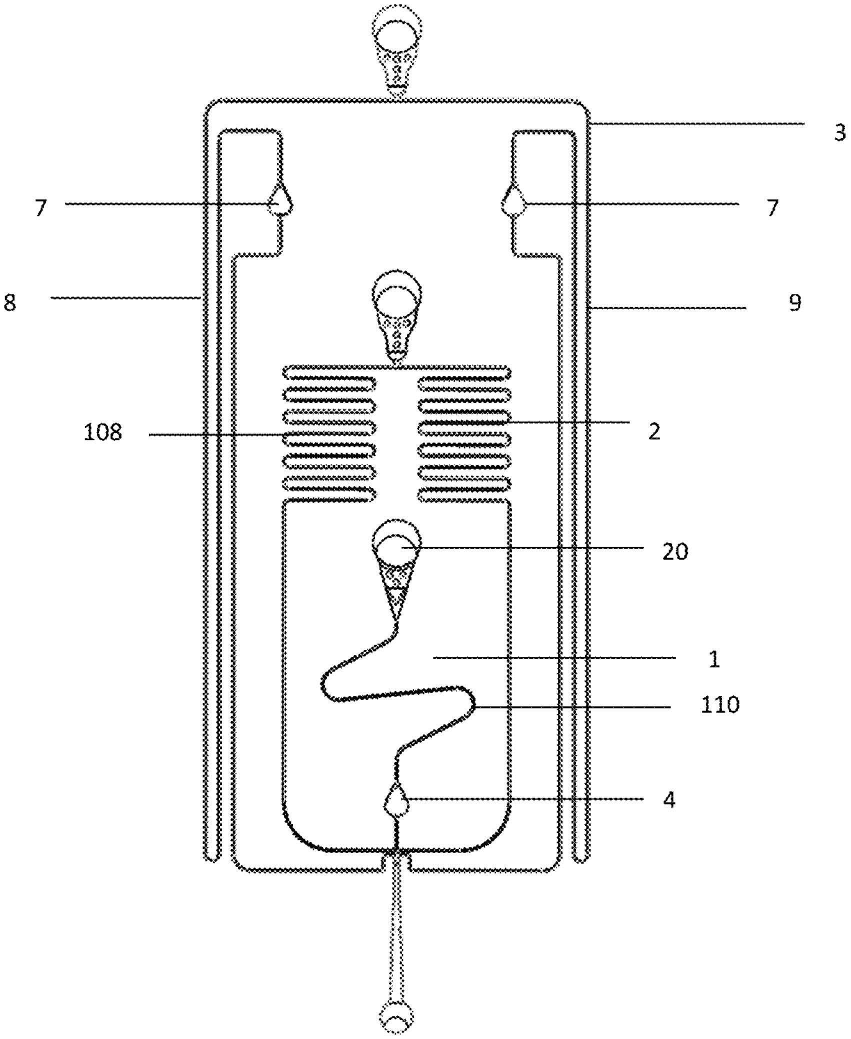
FIG. 3 is a schematic diagram of an overall structure of a droplet generator.

The schematic diagram of a droplet generator provided by the example is shown as FIGS. 1 to 3, wherein FIG. 1 is a schematic diagram of a large-corner continuous U-shaped flow channel of an encoded microsphere flow channel; FIG. 2 is a schematic diagram of an encoded microsphere flow channel in a droplet generator; and FIG. 3 is a schematic diagram of an overall structure of a droplet generator.

As shown as FIGS. 1 to 3, a single-cell single-encoded microsphere droplet generator comprises an encoded microsphere flow channel 1, a cell flow channel 2 and an oil-phase flow channel 3, wherein the encoded microsphere flow channel 1 is provided with a large-corner continuous U-shaped flow channel 110 and an encoded microsphere buffer tank 4.

As shown in FIG. 1, the large-corner continuous U-shaped flow channel 110 of the encoded microsphere flow channel 1 comprises a first turn 101, a second turn 102, a straight flow channel 103 connecting two turns, an inlet segment straight flow channel 104 and an outlet segment straight flow channel 105, wherein the size of a turning radius 106 of the first turn 101 is 6 times greater than the width of the encoded microsphere flow channel 1, and the size of a turning radius 7 of the second turn 102 is also 6 times greater than the width of the encoded microsphere flow channel 1. Because the diameter of encoded microsphere is larger and is about 50 μm generally, a filter membrane with the pore diameter of less than 50 μm cannot be adopted for filtration, and impurities such as dust and microfibers can be remained in encoded microsphere suspension. When a common continuous U-shaped flow channel (such as a continuous U-shaped flow channel 108 of the cell flow channel 2 in FIG. 3) is adopted, the impurities such as the dust and the microfibers in the encoded microsphere suspension are easy to gradually accumulate at the turns of the continuous U-shaped flow channel in the continuous using process to cause blockage so as to seriously influence the preparation efficiency and the quality of droplets. In this example, the radius of the turns (the first turn 101 or the second turn 102) is controlled in a proper large range by arranging the continuous U-shaped flow channel 110 with large turns for the encoded microsphere suspension, and when the microsphere suspension passes through the turning radius, the impurities such as the dust and the microfibers cannot be accumulated at the turns at a certain flow rate, so that the problem that the encoded microsphere suspension is easy to block at the turns after long-time operation is solved.

For example, in this example, when the flow rate of encoded microsphere suspension is 0.01-0.1 μL/s, impurities such as dust and microfibers in the encoded microsphere suspension are completely washed away when the encoded microsphere suspension passes through a turning with a larger turning radius at the flow rate, and the impurities cannot be accumulated at the turning; however, at the same flow rate, if the turning radius is smaller, the impurities such as the dust and the microfibers in the encoded microsphere suspension are possibly not taken away in time and are gradually deposited, the flow resistance is larger and the flow rate is smaller and smaller along with more and more deposition of the impurities such as the dust and the microfibers, the deposition phenomenon is further aggravated, and blockage can be caused after long-time operation. A large number of studies have demonstrated that, when the flow rate of the encoded microsphere suspension is 0.01-0.1 μL/s, the impurities such as the dust and the microfibers in the encoded microsphere suspension cannot be accumulated at the turning only by controlling the turning radius of the continuous U-shaped flow channel 110 to be more than 6 times the width of an encoded microsphere flow channel 1, so that long-time smooth operation of the encoded microsphere flow channel 1 is guaranteed. Particularly, under the condition that some fibers are longer, the fibers can be curled up to block a micro-channel, and the length of the fibers is generally larger than the width or the depth of the micro-channel.

The first turn 101 and the second turn 102 are both arc-shaped flow channels, can be in regular arc shapes, and can also be arc-shaped flow channels composed of a plurality of sections of circular arc-shaped flow channels with different radii, but the radius of at least one section of arc shape must be more than 6 times the width of the flow channels.

The straight flow channel 103 and the inlet segment straight flow channel 104 can be parallel or not parallel, and the straight flow channel 103 and the outlet segment strain flow channel 105 can be parallel or not parallel. In this example, the straight flow channel 103 and the inlet segment straight flow channel 104 are not parallel, and the straight flow channel 103 and the inlet segment straight flow channel 104 intersect with each other along the extension line of the first turn 101 to form an acute angle; the straight flow channel 103 and the outlet segment strain flow channel 105 are not parallel, and the straight flow channel 103 and the outlet segment strain flow channel 105 intersect with each other along the extension line of the second turn 102 to form an acute angle.

Preferably, the turning radius of the large-corner continuous U-shaped flow channel 110 is 6 to 20 times the width of the encoded microsphere flow channel 1. The turning radius of the continuous U-shaped flow channel 110 cannot be increased infinitely, the layout arrangement of a whole microfluidic system, the space area occupied by the flow channel and cost control need to be considered, meanwhile, proper control over flow resistance needs to be guaranteed, and therefore the flow speed of encoded microsphere flow is controlled, and generation of effective droplets is guaranteed. In this example, the turning radius of the large-corner continuous U-shaped flow channel 110 is 10 times the width of the encoded microsphere flow channel 1. As is proved by experiments, when the turning radius of the continuous U-shaped flow channel 110 is 10 times the width of the encoded microsphere flow channel 1, it can be guaranteed that dust, microfibers and other impurities in encoded microsphere suspension cannot be accumulated at the turning, the flow resistance can be better controlled, and therefore the flow speed of the encoded microsphere flow is stabilized, and the generation efficiency of the effective droplets is further improved.

The straight flow channel 103 connecting two turns can be arranged horizontally or arranged in a slightly upward inclined manner. In this example, as shown in FIG. 1, the straight flow channel 103 connecting the two turns is slightly inclined upwardly (the upward direction is the upstream direction of a fluid), so that the flow resistance can be improved, and the flow rate can be controlled more stably.

Preferably, as shown in FIG. 1 and FIG. 2, the angle 111 between the inlet segment straight flow channel 104 and an encoded microsphere flow channel inlet segment 109 of the large-corner continuous U-shaped flow channel 110 is larger than 90 degrees (the encoded microsphere flow channel inlet segment 109 is directly connected with an encoded microsphere flow channel inlet 125), and the angle 13 between the outlet segment straight flow channel 105 and the encoded microsphere flow channel outlet segment 112 of the large-corner continuous U-shaped flow channel 110 is larger than 90 degrees. According to the above arrangement, it is guaranteed that the continuous U-shaped flow channel 110 is bent greatly, and meanwhile the connecting positions of the continuous U-shaped flow channel 110 and other straight light flow channels need to be bent greatly, so that the phenomenon that the continuous U-shaped flow channel 110 is bent by less than 90 degrees is avoided. By means of the design, the encoded microsphere suspension can be smoothly transited from other straight flow channels to the continuous U-shaped flow channel 110 and from the continuous U-shaped flow channel 110 to other straight flow channels, and blocking caused by impurities such as dust and microfibers in the encoded microsphere suspension can be prevented.

Preferably, In this example, the width of the encoded microsphere flow channel 1 is 50 μm, and the turning radius of the large-corner continuous U-shaped flow channel 110 is 500 μm. The widths of all encoded microsphere flow channels 1 are the same, the continuous U-shaped flow channel 110 is a part of the encoded microsphere flow channels 1, and the width of the continuous U-shaped flow channel 110 is the same as the width of the other part of the encoded microsphere flow channels 1.

Preferably, the total length of the large-corner continuous U-shaped flow channel 110 is 20,000 μm; the straight flow channel 103 connecting two turns inclines upwards, an angle 114 between the straight flow channel and the horizontal line is 15 degrees, and the length of the straight flow channel is 6,240 μm; the length of the inlet segment straight flow channel 104 is 5,000 μm, and an angle 111 between the inlet segment straight flow channel and the encoded microsphere flow channel inlet segment 109 is 120 degrees; the length of the outlet segment straight flow channel 105 is 5,000 μm, and an angle 113 between the outlet segment strain flow channel and the encoded microsphere flow channel outlet segment 112 is 120 degrees. By controlling the total length of the continuous U-shaped flow channel 110 and the length of each straight flow channel in the continuous U-shaped flow channel 110, the flow resistance can be further helped to be controlled more accurately, the flow rate is helped to be adjusted more accurately, and therefore the generation rate of effective droplets is increased.

As shown in FIG. 2 and an FIG. 3, the width of the widest part of the encoded microsphere buffer tank 4 is 5 to 15 times the width of the encoded microsphere flow channel 1, and the depth of the deepest part of the encoded microsphere buffer tank is 2 to 5 times the depth of the encoded microsphere flow channel 1; the shape of the encoded microsphere buffer tank 4 gradually enlarges from top to bottom and then rapidly retracts downwardly, the whole is similar to a water drop shape, and the boundary is smooth. The shape of the encoded microsphere buffer tank 4 has a very important influence on control over the flow rate of encoded microsphere, the shape of the encoded microsphere buffer tank gradually enlarges from top to bottom and then rapidly retracts downwardly, the flow resistance of encoded microsphere suspension entering the encoded microsphere buffer tank 4 is gradually reduced, the flow resistance is rapidly increased after the encoded microsphere buffer tank passes through the encoded microsphere buffer tank 4, and therefore the encoded microspheres are pre-arranged in the encoded microsphere buffer tank 4; after the encoded microsphere buffer tank 4 is filled, each encoded microsphere overcomes the suddenly-increased flow resistance from the lower end of the encoded microsphere buffer tank 4 one by one and flows out along with fluid at equal intervals. The boundary of the encoded microsphere buffer tank 4 is smooth, the dead volume can be avoided, and the encoded microsphere stored in the encoded microsphere buffer tank 4 can flow out in sequence and cannot stay in the encoded microsphere buffer tank. The size of the encoded microsphere buffer tank 4 can directly influence the effects of pre-arrangement of the encoded microspheres and spacing control of the encoded microspheres of the encoded microsphere buffer tank 4. The width of the widest part of the encoded microsphere buffer tank 4 is 5 to 15 times the width of the encoded microsphere flow channel 1, the depth of the deepest part of the encoded microsphere buffer tank is 2 to 5 times the depth of the encoded microsphere flow channel 1, the effect of the encoded microsphere buffer tank 4 can be better guaranteed, and efficient and high-quality generation of droplets is guaranteed.

Preferably, the encoded microsphere flow channel 1 further comprises a large-corner continuous U-shaped flow channel 110, an encoded microsphere buffer tank 4 is located below the large-corner continuous U-shaped flow channel 110, and encoded microsphere suspension passes through the large-corner continuous U-shaped flow channel 110 from the encoded microsphere inlet 20 and then enters the encoded microsphere buffer tank 4. It can be understood that the encoded microsphere buffer tank 4 plays a role normally, has a close relation with the property, and can achieve pre-arrangement of encoded microspheres and accurate control over the spacing of discharging the encoded microspheres only through the shape that the encoded microsphere buffer tank gradually enlarges downwards and then rapidly retracts downwardly in a vertically downward straight flow channel, the large-corner continuous U-shaped flow channel 110 is completely a bent flow channel, no vertically downward straight flow channel exists, and therefore the encoded microsphere buffer tank 4 cannot be arranged on the large-corner continuous U-shaped flow channel 110 and can only be arranged on a vertical straight flow channel 6 behind the large-corner continuous U-shaped flow channel. In this example, the width of the encoded microsphere flow channel 1 is 50 μm, and the depth of the encoded microsphere flow channel is 50 μm; the width of the widest portion of the encoded microsphere buffer tank 4 is 500 μm, the depth of the deepest portion of the encoded microsphere buffer tank is 150 μm, and the length of the deepest portion of the encoded microsphere buffer tank 4 is 1,280 μm.

As shown in FIG. 2, an oil-phase flow channel 3 is provided with an oil phase buffer tank 7. The oil-phase flow channel 3 is divided into a first oil-phase flow channel 8 and a second oil-phase flow channel 9, and the first oil-phase flow channel 8 and the second oil-phase flow channel 9 are respectively provided with an oil phase buffer tank 7. The first oil-phase flow channel 8 and the second oil-phase flow channel 9 are respectively provided with an oil-phase continuous U-shaped flow channel 10, and the oil phase buffer tank 7 is positioned on the oil-phase continuous U-shaped flow channel 10.

Preferably, the width of the oil phase buffer tank 7 is 5 to 15 times the width of the oil-phase flow channel 3, and the depth of the oil phase buffer tank is 2 to 5 times the depth of the oil-phase flow channel 3; the shape of the oil phase buffer tank 7 gradually enlarges from top to bottom and then is rapidly retracts downwardly, and the boundary is smooth. The oil phase buffer tank 7 is equivalent to a reservoir, so that the oil phase must fill the oil phase buffer tank 7 firstly and then flows to the oil-phase flow channel 3 behind. The size of the oil phase buffer tank 7 directly affects the effects of increasing the controllability of the oil phase buffer tank 7 to the flow rate of the oil phase and improving the resistance of the oil phase to reversely permeate into a water phase. The width of the oil phase buffer tank 7 is controlled to be 5 to 15 times the width of the oil-phase flow channel, and the depth of the oil phase buffer tank is controlled to be 2 to 5 times the depth of the oil-phase flow channel, so that the effects achieved by the oil phase buffer tank 7 can be better ensured, and high-efficiency and high-quality generation of effective droplets is further ensured. In this example, the width of the oil-phase flow channel 3 is 40 μm, and the depth of the oil-phase flow channel is 40 μm; the width of the widest part of the oil phase buffer tank 7 is 400 μm, the depth of the deepest part of the oil phase buffer tank is 150 μm, and the length of the oil phase buffer tank is 1,280 μm.

The droplet generator of this example adopts a double cross-shaped droplet generator, a first cross-shaped flow channel 11 is formed by a cell flow channel 2 and an encoded microsphere flow channel 1, and a second cross-shaped flow channel 13 is formed by an output channel 12 of the first cross-shaped flow channel 11 and the oil-phase flow channel 3.

As shown in FIG. 3, the encoded microsphere flow channel 1 and the cell flow channel 2 form a first cross-shaped flow channel 11. Because a cell sample is very precious and rare, and the cell volume is small, the cell suspension is almost like an aqueous phase, and the ratio of effective drops can be increased as much as possible only by controlling the flow rate of the cell suspension, so that the flow condition of each cell is difficult to accurately control;

and the encoded microspheres are low in price, large in amount, large in volume and easy to control. In order to ensure that the first cross-shaped flow channel 11 can just meet one encoded microsphere and is smoothly wrapped each time when the cell suspension flows out, the flow rate of the cell suspension needs to be controlled as much as possible, and more importantly, the spacing between each encoded microsphere and the encoded microsphere needs to be controlled as much as possible, so that each cell can be combined with the corresponding encoded microsphere and is wrapped into a droplet when passing through the corresponding encoded microsphere, and thus the cell sample can be fully utilized, the waste of expensive cell samples cannot be caused, and the ratio of effective drops can be increased. The output channel 12 of the first cross-shaped flow channel 11 and the oil-phase flow channel 3 form a second cross-shaped flow channel 13, and after passing through the second cross-shaped flow channel 13, the encoded microspheres and the cells are wrapped by an oil phase and are sheared to generate droplets.

Figure 4:
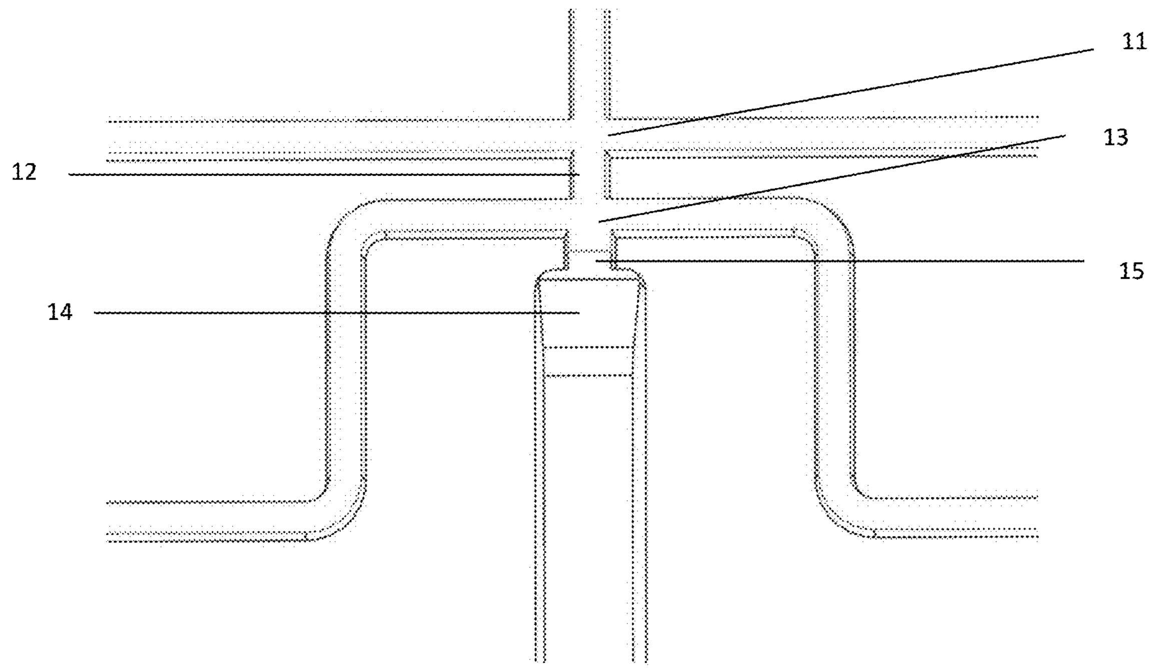
FIG. 4 is an enlarged view of a specific structure of a droplet generator.
Figure 5:
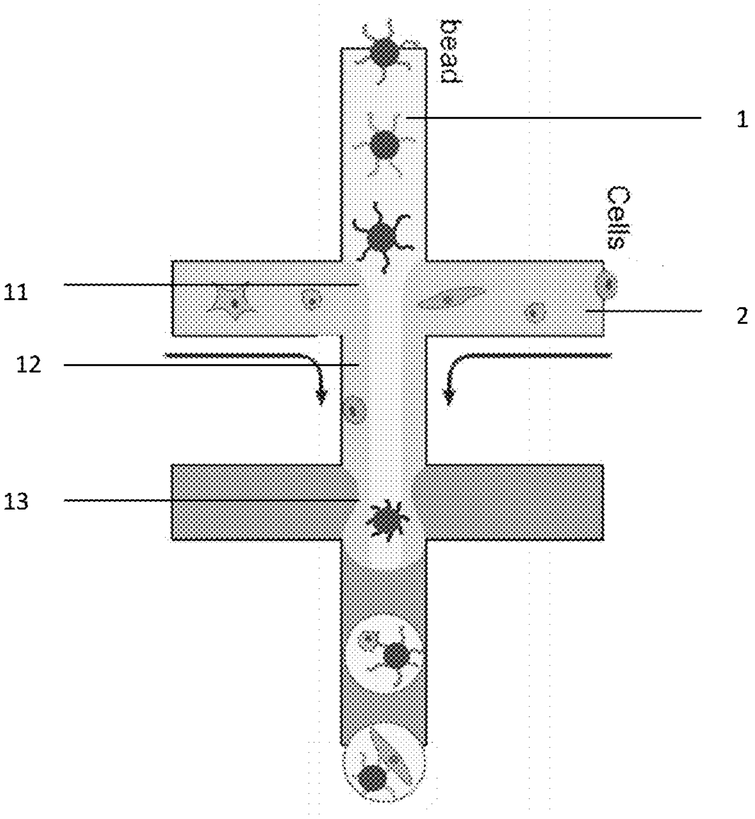
FIG. 5 is a schematic diagram of a process flow of droplet wrapping.

As shown in FIG. 4, the length of an output channel 12 between the first cross-shaped flow channel 11 and the second cross-shaped flow channel 13 must be kept at 20-500 μm, so that the effect of forming effective droplets by shearing and wrapping an oil phase can be better exerted, and the main reason is that a certain time interval is needed between the droplets formed by shearing and wrapping the oil phase every time, and the spacing between the first cross-shaped flow channel 11 and the second cross-shaped flow channel 13 needs to be matched with the time interval between the droplets formed by shearing and wrapping the oil phase every time as much as possible, so that the efficiency of generating the effective droplets can be further improved. In the, the length of the output channel 12 between the first cross-shaped flow channel 11 and the second cross-shaped flow channel 13 is 80 μm.

Preferably, the width and/or depth of the outlet segment flow channel 14 of the second cross-shaped flow channel 13 is larger than that of the outlet end 15. When the width and/or depth of the outlet segment flow channel 14 of the second cross-shaped flow channel 13 is larger than that of the outlet end 15, generated droplets can flow out more quickly, and due to the fact that the width and/or depth is increased, the flow resistance is reduced, and the flow speed is increased. Due to the fact that the width and/or depth is increased, the flow resistance is reduced, the flow speed is increased, but the flow speed cannot be too high, otherwise, subsequent droplet sorting is difficult, when the width of the outlet segment flow channel 14 of the second cross-shaped flow channel 13 is 1.5 to 3 times that of the outlet end 15, more effective droplets can be obtained more efficiently, and the flow resistance and the flow speed are both within a controllable range. In this example, the width of the outlet segment flow channel of the second cross-shaped flow channel is twice that of the outlet end, namely 100 μm.

Example 2 Effect of the Turning Radius of a Large-Corner Continuous U-Shaped Flow Channel on Preparation of Single-Cell Single-Encoded Microsphere Droplets In this example, the single-cell single-encoded microsphere droplet generator provided by Example 1 is used to prepare single-cell single-encoded microsphere droplets, wherein the turning radius of the large-corner continuous U-shaped flow channel of the encoded microsphere flow channel is respectively 3 times (150 μm), 6 times (300 μm), 10 times (500 μm), 15 times (750 μm), 20 times (1,000 μm) and 25 times (1,250 μm) of the width of the flow channel; the pressure at the inlet of the encoded microsphere flow channel is controlled at 3.0 psi; the pressure at the inlet of a cell flow channel is controlled at 4.5 psi; the pressure at the inlet of an oil-phase flow channel is controlled at 8.5 psi; the encoded microsphere in the encoded microsphere suspension adopts 6% polyethylene glycol hydrogel microspheres (50-55 μm); the cell phase is that 10000 HEK293T cells (ATCC) are suspended in 100 μm of cell buffer (50 mM Tris, 75 mM KCl, 3 mM MgCl2, 13% Optiprep (Sigma; D1556), and the pH is 8.3); the oil phase is fluorinated oil containing 2% of surfactant FS10 (the following examples adopt consistent encoded microsphere, cell and oil phases); the flow resistance and flow rate changes of the flow channel and whether the blocking condition exists after continuous operation for 1 hour are detected, samples are taken to compare the total number of generated droplets and the number of generated effective droplets, the ratio of effective droplets is calculated, the effect of the turning radius of the large-corner continuous U-shaped flow channel on the preparation of the single-cell single-encoded microsphere droplets is investigated, and the results are shown in Table 1.

TABLE 1

Effect of turning radius on preparation of single-cell single-encoded microsphere droplets

| Turning radius (μm) | Changes of flow resistance | Flow of encoded microsphere (μL/s) | Blockage | Total number of sampled droplets | Number of effective droplets | Ratio of effective droplets (%) |
|---|---|---|---|---|---|---|
| 150 | Increased flow resistance | 0.015 | Blocked | 159814 | 27680 | 17.32 |
| 300 | Stable flow resistance | 0.030 | None | 206013 | 106076 | 51.49 |
| 500 | Stable flow resistance | 0.050 | None | 219814 | 156200 | 71.06 |
| 750 | Stable flow resistance | 0.063 | None | 220141 | 132833 | 60.34 |
| 1000 | Stable flow resistance | 0.069 | None | 225587 | 117350 | 52.02 |
| 1250 | Stable flow resistance | 0.075 | None | 234435 | 90656 | 38.67 |

As shown in Table 1, when the turning radius is 3 times the width of the flow channel, an obvious blocking phenomenon occurs after continuous operation for one hour, so that the flow resistance gradually rises, the flow speed gradually decreases, the droplet generation speed decreases, and the proportion of effective droplets is also obviously decreased; when the turning radius rises to 6 times the width of the flow channel, impurities such as dust and microfibers in encoded microsphere dispersion are difficult to accumulate at the turning at the flow speed generated by the pressure of an encoded microsphere inlet, so that the blocking phenomenon is avoided, the flow resistance and the flow speed are always kept stable, more droplets are generated, and the ratio of effective droplets is also increased; and with the continuous increase of the turning radius, the flow resistance becomes smaller, the flow speed is increased, the number of generated droplets is increased, but the control difficulty is increased due to the too high flow speed, and the Ratio of the generated effective droplets is decreased. In addition, considering from the aspects of processing and the overall layout of the flow channel, the turning radius is not suitable for being too large, the turning radius is preferably 10 times the width of the flow channel, at the moment, the flow speed is stably kept at 0.060 μL/s, and the ratio of effective droplets reaches 71.06%.

Example 3 Effect of the Angle of Upward Inclination of the Straight Flow Channel Connecting Two Turnings on Preparation of Single-Cell Single-Encoded Microsphere Droplets In this example, the single-cell single-encoded microsphere droplet generator provided by Example 1 is adopted to prepare single-cell single-encoded microsphere droplets, wherein the turning radius of the large-corner continuous U-shaped flow channel is 10 times the width of the flow channel, the angle of upward inclination of the straight flow channel connecting two turnings is 0, 5, 10, 15, 20, 25 and 30 degrees respectively. The pressure at the inlet of the encoded microsphere flow channel is controlled at 3.0 psi, the pressure at the inlet of the cell flow channel is 4.5 psi and the pressure at the inlet of the oil-phase flow channel is 8.5 psi. The flow resistance and flow rate change condition of the encoded microsphere flow channel and whether the blocking condition exists after continuous operation for 1 hour are detected, samples are taken to compare the total number of generated droplets and the number of generated effective droplets, the ratio of effective droplets is calculated, the effect of the angle of upward inclination of the straight flow channel at the two turnings of the large-corner continuous U-shaped flow channel on the preparation of the single-cell single-encoded microsphere droplets is investigated, and the results are shown in Table 2.

TABLE 2

Effect of the angle of upward inclination of the straight flow channel connecting the two turnings on the preparation of single-cell single-encoded microsphere droplets

| Angle of inclination (degrees) | Changes of flow resistance | Flow of encoded microsphere (μL/s) | Blockage | Total number of sampled droplets | Number of effective droplets | Ratio of effective droplets (%) |
|---|---|---|---|---|---|---|
| 0 | Stable flow resistance | 0.050 | None | 229508 | 117324 | 51.12 |
| 5 | Stable flow resistance | 0.049 | None | 227461 | 140753 | 61.88 |
| 10 | Stable flow resistance | 0.046 | None | 219282 | 157993 | 72.05 |
| 15 | Stable flow resistance | 0.042 | None | 217327 | 158040 | 72.72 |
| 20 | Stable flow resistance | 0.038 | None | 198492 | 122549 | 61.74 |
| 25 | Stable flow resistance | 0.031 | None | 174623 | 90193 | 51.65 |
| 30 | Gradually increased flow resistance | 0.013 | Blocked | 129332 | 35683 | 27.59 |

As shown in Table 2, the angle of upward inclination of the straight flow channel connecting the two turnings has a great influence on the generation ratio of the effective droplets. The reason is that, different flow resistance is produced at different angles of upward inclination, which influences the flow rate and thus influences the generation of effective droplets. When the angle of upward inclination of the straight flow channel at the two turnings is 5 degrees, it is stable after 1 hour of continuous operation, and there is no obvious blockage, the flow rate is faster, the droplet generation speed is faster, and the proportion of effective droplets is 11.12%; with the increase of the angle of inclination, the flow resistance increases, the flow rate decreases, the flow rate becomes slower, and it is easier to control, and the proportion of effective droplets also increases significantly; but when the angle of inclination reaches 30 degrees, the flow resistance increases, the flow rate drops significantly, causing reappearance of the blockage phenomenon, and the ratio of effective droplets drops rapidly. Therefore, the angle of upward inclination of the straight flow channel connecting the two turnings in the large-corner continuous U-shaped flow channel is preferably 10-15 degrees, most preferably 15 degrees, and the ratio of generated effective droplets is the highest, up to 72.72%.

Example 4 Effect of the Total Length of the Large-Corner Continuous U-Shaped Flow Channel on the Preparation of Single-Cell Single-Encoded Microsphere Droplets In this example, the single-cell single-encoded microsphere droplet generator provided by Example 1 is used to prepare single-cell single-encoded microsphere droplets.

The turning radius of the large-corner continuous U-shaped flow channel is 10 times the width of the flow channel. The angle of upward inclination of the straight flow channel at the two turnings is 15 degrees, and the total length of the large-corner continuous U-shaped flow channel is 10,000 μm, 15,000 μm, 20,000 μm, 25,000 μm, 30,000 μm, respectively, wherein the ratio of the length of the inlet segment straight flow channel to the length of the straight flow channel connecting two turnings to the linear length of the outlet segment is 1:1.25:1. The pressure at the inlet of the encoded microsphere flow channel is controlled at 3.0 psi, the pressure at the inlet of the cell flow channel is controlled at 4.5 psi, and the pressure at the inlet of the oil-phase flow channel is controlled at 8.5 psi. The flow resistance and flow rate changes of the encoded microsphere flow channel and whether the blocking condition exists after continuous operation for 1 hour are detected, samples are taken to compare the total number of generated droplets and the number of generated effective droplets, the ratio of effective droplets is calculated, the effect of the total length of the large-corner continuous U-shaped flow channel on the preparation of the single-cell single-encoded microsphere droplets is investigated, and the results are shown in Table 3.

TABLE 3

Effect of the total length of the large-corner continuous U-shaped flow channel on the preparation ofsingle-cell single-encoded microsphere droplets

| Total length (μm) | Changes of flow resistance | Flow of encoded microsphere (μL/s) | Blockage | Total number of sampled droplets | Number of effective droplets | Ratio of effective droplets (%) |
|---|---|---|---|---|---|---|
| 10000 | Stable flow resistance | 0.0068 | None | 227032 | 136923 | 60.31 |
| 15000 | Stable flow resistance | 0.0061 | None | 219817 | 156883 | 71.37 |
| 20000 | Stable flow resistance | 0.0052 | None | 216735 | 158108 | 72.95 |
| 25000 | Stable flow resistance | 0.0047 | None | 206211 | 145420 | 70.52 |
| 30000 | Stable flow resistance | 0.0031 | None | 195754 | 120741 | 61.68 |

As shown in Table 3, the total length of the large-corner continuous U-shaped flow channel also exerts certain effect on the ratio of generating effective droplets. The reason may be that, the total length is different, the flow resistance produced is different, thereby influencing the flow rate and the generation of effective droplets. When the total length of the large-corner continuous U-shaped flow channel is 1000 μm, it is stable after 1 hour of continuous operation, and there is no obvious blocking phenomenon, but the flow rate is faster, the droplet generation speed is faster, and the proportion of effective droplets is slightly lower; as the total length of the large-corner continuous U-shaped flow channel increases, the flow resistance increases, the flow rate decreases, and it is easier to control, and the proportion of effective droplets also increases; but when the total length reaches 3,000 μm, because of a large flow resistance, the flow rate decreases obviously and the ratio of effective droplets also decreases obviously. Thus, the total length of the large-corner continuous U-shaped flow channel is preferably 1,500-2,500 μm, and most preferably 2,000 μm, and the ratio of generated effective droplets is the highest.

Example 5 Effect of the Size of Encoded Microsphere Buffer Tank on the Preparation of Single-Cell Single-Encoded Microsphere Droplets In this example, the droplet generator provided by Example 1 is used. The angle of upward inclination of the straight flow channel at two turnings is 15 degrees. The total length of the large-corner continuous U-shaped flow channel is 2000 μm, and an encoded microsphere buffer tank is provided. Wherein the size of the encoded microsphere buffer tank is set as follows: the width at the widest part is 3 times (150 μm), 5 times (250 μm), 10 times (500 μm), 15 times (750 μm), and 20 times (1,000 μm) of the width of the encoded microsphere flow channel 1 respectively, the depth at the deepest part is 1 time (50 μm), 2 times (100 μm), 3 times (150 μm), 5 times (250 μm) and 7 times (350 μm) of the depth of encoded microsphere flow channel 1 respectively, the length is 1,280 μm. The size of the encoded microsphere buffer tank is set as shown in Table 1. The pressure at the inlet of the encoded microsphere flow channel is controlled at 3.0 psi; the pressure at the inlet of the cell flow channel is controlled at 4.5 psi; the pressure at the inlet of an oil-phase flow channel is controlled at 8.5 psi; after continuous operation for 1 hour, the effect of the size of the encoded microsphere buffer tank on the preparation of single-cell single-encoded microsphere droplets is investigated, wherein the flow rate of the encoded microspheres is the flow rate of the encoded microspheres at the outlet of the encoded microsphere buffer tank, and the results are shown in Table 4.

TABLE 4

Effect of the size of the encoded microsphere buffer tank on the preparation of single-cell single-encoded microsphere droplets

| Serial No. | Width at the widest part (μm) | Depth at the deepest part (μm) | Flow rate of encoded microspheres (μL/s) | Total number of sampled droplets | Number of effective droplets | Ratio of effective droplets (%) |
|---|---|---|---|---|---|---|
| 1 | 150 | 50 | 0.060 | 58038 | 27789 | 47.88 |
| 2 | 300 | 100 | 0.056 | 62423 | 38127 | 61.08 |

TABLE 4-continued

Effect of the size of the encoded microsphere buffer tank on the preparation of single-cell single-encoded microsphere droplets

| Serial No. | Width at the widest part (μm) | Depth at the deepest part (μm) | Flow rate of encoded microspheres (μL/s) | Total number of sampled droplets | Number of effective droplets | Ratio of effective droplets (%) |
|---|---|---|---|---|---|---|
| 3 | 500 | 150 | 0.050 | 67157 | 48816 | 72.69 |
| 4 | 750 | 250 | 0.046 | 64072 | 39308 | 61.35 |
| 5 | 1000 | 350 | 0.040 | 57781 | 34663 | 59.99 |

As shown in Table 4, the size of the encoded microsphere buffer tank has a great influence on the preparation of single-cell single-encoded microsphere droplets. When the size is small, the re-aggregation effect of the encoded microspheres is poor, and it is possible that, the encoded microspheres have not been well pre-arranged in the buffer tank before flowing out of the lower end of the buffer tank. There is also a deviation in the spacing control effect of the encoded microspheres after flowing out, and the encoded microspheres have a faster flow rate, which affects the proportion of effective droplets. When the size is too large, the time of the encoded microsphere flowing out of the buffer tank and reaching the cross position will be much slower than that of the cell phase, resulting in waste of samples. Therefore, the size of the encoded microsphere buffer tank is preferably 10 times the width of the encoded microsphere flow channel 1 (500 μm) at the widest part, and the depth of the deepest part is 3 times the depth of the encoded microsphere flow channel 1 (150 μm). At this time, the ratio of effective droplets reaches 72.69%.

Example 6 Effect of Size of Oil Phase Buffer Tank on the Preparation of Single-Cell Single-Encoded Microsphere Droplets In this example, the droplet generator provided by Example 1 is used. The angle of upward inclination of the straight flow channel at the two turnings is 15 degrees. The total length of the large-corner continuous U-shaped flow channel is 2,000 μm, and an encoded microsphere buffer tank is provided, in which the size of the encoded microsphere buffer tank is 500 μm at the widest part, 150 μm at the deepest part. The size of the oil phase buffer tank is set as follows: the width is (120 μm), 5 times (200 μm), 10 times (400 μm), 15 times (600 μm), 20 times (800 μm) of the width of the oil-phase flow channel 3, and the depth is 1 time (50 μm), 2 times (100 μm), and 3 times (150 μm), 5 times (250 μm), 7 times (350 μm) of the depth of the oil-phase flow channel 3, and the length is 1280 μm. The size of the oil phase buffer tank is set as shown in Table 2. The pressure at the inlet of the encoded microsphere flow channel is controlled at 3.0 psi; the pressure at the inlet of the cell flow channel is controlled at 4.5 psi; the pressure at the inlet of an oil-phase flow channel is controlled at 8.5 psi; after continuous operation for 1 hour, the effect of the size of the oil phase buffer tank on the preparation of single-cell single-encoded microsphere droplets is investigated. The results are shown in Table 5.

TABLE 5

Effect of the size of the oil phase buffer tank on the preparation of single-cell single-encoded microsphere droplets

| Serial No. | Width at the widest part (μm) | Depth at the deepest part (μm) | Flow rate of oil phase (μL/s) | Number of effective droplets | Number of effective droplets | Ratio of effective droplets (%) |
|---|---|---|---|---|---|---|
| 1 | 120 | 50 | 0.040 | 62452 | 30014 | 48.06 |
| 2 | 200 | 100 | 0.034 | 62673 | 40825 | 65.14 |
| 3 | 400 | 150 | 0.030 | 67966 | 49513 | 72.85 |
| 4 | 600 | 250 | 0.026 | 64114 | 35666 | 55.37 |
| 5 | 800 | 350 | 0.020 | 67868 | 27799 | 40.96 |

As shown in Table 5, the size of the oil phase buffer tank also has a great influence on the preparation of single-cell single-encoded microsphere droplets. When the size is small, the control effect on the oil phase flow rate is small; when the size is too large, the oil phase flow rate is too slow. Therefore, the size of the oil phase buffer tank is preferably 10 times the width of the oil-phase flow channel 3 (400 μm) at the widest part, and the depth of the deepest part is 3 times the depth of the oil-phase flow channel 3 (150 μm). At this time, the ratio of effective droplets reaches 72.85%.

Example 7 Effect of Combined Design of a Large-Corner Continuous U-Shaped Flow Channel and an Encoded Microsphere Buffer Tank on the Preparation of Single-Cell Single-Encoded Microsphere Droplets In this embodiment, three groups of droplet generators are used respectively. The first group uses a droplet generator with the combination of the large-corner continuous U-shaped flow channel and the encoded microsphere buffer tank provided by Example 1, the second group uses a droplet generator containing the large-corner continuous U-shaped flow channel only, and the third group uses a droplet generator containing the encoded microsphere buffer tank only, and the fourth group uses an existing common continuous U-shaped flow channel and a droplet generator without an encoded microsphere buffer tank. After operating for 1 hour continuously, the effect of the combined design of the large-corner continuous U-shaped flow channel and the encoded microsphere buffer tank on the preparation of single-cell single-encoded microsphere droplets is investigated. The results are shown in Table 6.

TABLE 6

Effect of combined design of a large-corner continuous U-shaped flow channel and an encoded microsphere buffer tank on the preparation of single-cell single-encoded microsphere droplets

| Group | Flow rate of encoded microsphere suspension (μL/s) | Total number of sampled droplets | Number of effective droplets | Ratio of effective droplets (%) |
|---|---|---|---|---|
| First group | 0.051 | 67452 | 49280 | 73.06 |
| Second group | 0.065 | 72673 | 18270 | 25.14 |
| Third group | 0.088 | 107966 | 24670 | 22.85 |
| Fourth group (blank control) | 0.105 | 114114 | 17539 | 15.37 |

As shown in Table 6, when a large-corner continuous U-shaped flow channel (the second group) or an encoded microsphere buffer tank (the third group) is used alone in the encoded microsphere flow channel, compared with the combined design of a large-corner continuous U-shaped flow channel and an encoded microsphere buffer tank (the first group) in the encoded microsphere flow channel, although the total number of prepared droplets is large, the combined design of the large-corner continuous U-shaped flow channel and the encoded microsphere buffer tank has the synergistic effect of significantly improving the ratio of effective droplets, save the samples and reduce the costs, with very obvious beneficial effects.

Example 8 Effect of the Spacing Between the Second Cross-Shaped Flow Channel and the First Cross-Shaped Flow Channel on the Preparation of Single-Cell Single-Encoded Microsphere Droplets In this example, the droplet generator provided by Example 1 is used. The angle of upward inclination of the straight flow channel connecting the two turnings is 15 degrees. The total length of the large-corner continuous U-shaped flow channel is 20000 μm, and an encoded microsphere buffer tank is provided. The encoded microsphere buffer tank has a width of 500 μm at the widest part and a depth of 150 μm at the deepest part. The size of the oil phase buffer tank is 400 μm wide at the widest part and 150 μm deep at the deepest part. Wherein, the spacing between the second cross-shaped flow channel and the first cross-shaped flow channel is 20 μm, 40 μm, 60 μm, 80 μm, 150 μm, 350 μm and 500 μm respectively. The pressure at the inlet of the encoded microsphere flow channel is controlled at 3.0 psi; the pressure at the inlet of a cell flow channel is controlled at 4.5 psi; the pressure at the inlet of an oil-phase flow channel is controlled at 8.5 psi. After operating for 1 hour continuously, the effect of the spacing between the second cross-shaped flow channel and the first cross-shaped flow channel on the preparation of single-cell single-encoded microsphere droplets is investigated. The results are shown in Table 7.

TABLE 7

Effect of the spacing between the second cross-shaped flow channel and the first cross-shaped flow channel on the preparation of single-cell single-encoded microsphere droplets

| Serial No. | Spacing (μm) | Total number of sampled droplets | Number of effective droplets | Ratio of effective droplets (%) |
|---|---|---|---|---|
| 1 | 10 | 65845 | 18476 | 28.06 |
| 2 | 20 | 67321 | 29345 | 43.59 |
| 3 | 60 | 66349 | 39969 | 60.24 |
| 4 | 80 | 66678 | 48555 | 72.82 |
| 5 | 200 | 67962 | 42714 | 62.85 |
| 6 | 500 | 67411 | 27888 | 41.37 |
| 7 | 600 | 65878 | 19737 | 29.96 |

As shown in Table 7, the spacing between the second cross-shaped flow channel and the first cross-shaped flow channel also has a great influence on the preparation of single-cell single-encoded microsphere droplets. When the distance is less than 20 μm or greater than 500 μm, the proportion of limited droplets is reduced obviously, therefore, the spacing between the second cross-shaped flow channel and the first cross-shaped flow channel must be strictly controlled at 20-500 μm. The main reason is that a certain time interval is required between each shearing and wrapping of the oil phase to form droplets. The spacing between the first cross-shaped flow channel and the second cross-shaped flow channel needs to match the time interval between each shearing and wrapping of the oil phase to form droplets, so as to further improve the efficiency of generating effective droplets.

Example 9 Effect of the Droplet Nozzle Width of the Second Cross-Shaped Flow Channel on the Preparation of Single-Cell Single-Encoded Microsphere Droplets In this example, the droplet generator provided by Example 1 is used. The angle of upward inclination of the straight flow channel at two turnings is 15 degrees. The total length of the large-corner continuous U-shaped flow channel is 2,000 μm, and an encoded microsphere buffer tank is provided. The size of the encoded microsphere buffer tank is 500 μm wide at the widest part and 150 μm deep at the deepest part. The size of the oil phase buffer tank is 400 μm wide at the widest part and 150 μm deep at the deepest part. The spacing between the shaped flow channel and the first cross-shaped flow channel is 80 μm, respectively, and the droplet nozzle width (outlet end 15) (FIG. 4) of the second cross-shaped flow channel is 40 μm, 50 μm, 60 μm, 70 μm and 80 μm, respectively. The pressure at the inlet of the encoded microsphere flow channel is controlled at 3.0 psi; the pressure at the inlet of the cell flow channel is controlled at 4.5 psi; the pressure at the inlet of an oil-phase flow channel is controlled at 8.5 psi; after continuous operation for 1 hour, the effect of the droplet nozzle width (FIG. 4) of the second cross-shaped flow channel on the preparation of single-cell single-encoded microsphere droplets is investigated. Results are shown in Table 8.

TABLE 8

Effect of the droplet nozzle width of the second cross-shaped flow channel on the preparation of single-cell single-encoded microsphere droplets

| Serial No. | Width (μm) | Droplet suspension flow rate (μL/s) | Droplet preparation efficiency (droplet/s) | Ratio of effective droplets (%) |
|---|---|---|---|---|
| 1 | 40 | 0.032 | 520 | 38.24% |
| 2 | 50 | 0.040 | 641 | 58.34% |
| 3 | 60 | 0.054 | 934 | 72.82% |
| 4 | 70 | 0.062 | 1152 | 51.64% |
| 5 | 80 | 0.075 | 1349 | 46.27% |

As shown in Table 8, the droplet nozzle width of the second cross-shaped flow channel has a great influence on the preparation efficiency of single-cell single-encoded microsphere droplets. When the width is less than 60 μm, the flow rate of the droplet is slower, and the efficiency of droplet preparation is lower; when the width is more than 60 μm, the flow rate of droplets accelerates, and the efficiency of droplet preparation increases, but the ratio of effective droplets decreases. The main reason is that, with the increase in the width and/or depth, the flow resistance decreases and the flow rate accelerates. However, when the flow rate is too fast, the flow rate of the encoded microspheres is increased significantly, and phenomenon of multiple encoded microspheres appears in the droplets, and the ratio of effective droplets decreases. When the width of the outlet segment flow channel of the second cross-shaped flow channel is 60 μm, more effective droplets can be obtained more efficiently, and the flow resistance and flow rate are all within the controllable range.

Although the present invention is disclosed above, the present invention is not limited thereto. The present invention can be expanded according to the application ranges in the field of microfluidics. Any person skilled in the art can make various changes and modifications without departing from the spirit and scope of the present invention. Therefore, the scope of protection of the present invention should be based on the scope as claimed by the appended claims.

The invention claimed is:

1. A droplet generator, comprising a wrapped biological material flow channel, an encoded microsphere flow channel and an oil-phase flow channel; wherein the encoded microsphere flow channel comprises an arc-shaped flow channel and two straight flow channels, the arc-shaped flow channel comprises one or more segments of circular arc-shaped flow channels with different radii, at least one of the circular arc-shaped flow channels has a radius that is more than 6 times the width of the encoded microsphere flow channel; wherein, the encoded microsphere flow channel is also provided with an encoded microsphere flow channel tank, the flow resistance of the encoded microsphere fluid in the encoded microsphere buffer tank is less than the flow resistance of the encoded microsphere flow channel; the biological material can be selected from one or more of cells, nucleic acids, proteins, antibodies or antibody fragments; wherein extension lines of the two straight flow channels that are connected with the arc-shaped flow channel intersect at an acute angle; wherein the straight flow channels connecting the two arc-shaped flow channels are arranged to be inclined upwardly, the arc-shaped flow channel and the straight flow channel that is connected with the arc-shaped flow channel form a large-corner continuous U-shaped flow channel of the encoded microsphere flow channel; wherein the shape of the encoded microsphere buffer tank gradually enlarges from top to bottom, and then rapidly retracts downwardly.

2. The droplet generator according to claim 1, wherein the radius of the circular arc-shaped flow channel is 6 to 20 times the width of the flow channel.

3. The droplet generator according to claim 2, wherein the radius of the circular arc-shaped flow channel is 10 times the width of the flow channel.

4. The droplet generator according to claim 1, wherein there are one or more arc-shaped flow channels.

5. The droplet generator according to claim 4, wherein two or more than two of the arc-shaped flow channels are spaced.

6. The droplet generator according to claim 1, wherein the large-corner continuous U-shaped flow channel comprises an inlet segment straight flow channel and an outlet segment straight flow channel, and the angle between the inlet segment straight flow channel and the inlet segment of the encoded microsphere flow channel is greater than or equal to 90 degrees.

7. The droplet generator according to claim 6, wherein the angle between the outlet segment straight flow channel of the arc-shaped flow channel and the outlet segment of the encoded microsphere flow channel is greater than or equal to 90 degrees.

8. The droplet generator according to claim 1, wherein the volume of the encoded microsphere buffer tank is greater than the volume of the encoded microsphere flow channel of the same length.

9. The droplet generator according to claim 8, wherein the width of the encoded microsphere buffer tank is greater than the width of encoded microsphere flow channel, and/or the depth of the encoded microsphere buffer tank is greater than the depth of the encoded microsphere flow channel.

10. The droplet generator according to claim 9, wherein the width of the encoded microsphere buffer tank is 5 to 15 times the width of the encoded microsphere flow channel, and the depth of the encoded microsphere buffer tank is 2 to 5 times the depth of the encoded microsphere flow channel.

11. The droplet generator according to claim 10, wherein the shape of the encoded microsphere buffer tank gradually enlarges from top to bottom, and then rapidly retracts downwardly.

12. The droplet generator according to claim 11, wherein the encoded microsphere buffer tank is located downstream of the arc-shaped flow channel.

13. The droplet generator according to claim 12, wherein the oil-phase flow channel is provided with an oil phase buffer tank, and the flow resistance of the oil phase in the oil phase buffer tank is less than that in the oil-phase flow channel.

14. The droplet generator according to claim 13, wherein the oil-phase flow channel is divided into a first oil-phase flow channel and a second oil-phase flow channel, and each of the first oil-phase flow channel and the second oil-phase flow channel is provided with an oil phase buffer tank.

15. The droplet generator according to claim 14, wherein the first oil-phase flow channel and the second oil-phase flow channel comprise an arc-shaped flow channel, and the oil phase buffer tank is located upstream of the arc-shaped flow channel.

16. The droplet generator according to claim 15, wherein the volume of the oil phase buffer tank is greater than the volume of the oil-phase flow channel of the same length.

17. The droplet generator according to claim 16, wherein the width of the oil phase buffer tank is 5 to 15 times the width of the oil-phase flow channel, and the depth of the oil phase buffer tank is 2 to 5 times the depth of the oil-phase flow channel.

* * * * *